No. 860,909. PATENTED JULY 23, 1907.
M. FISCHER.
BRAKE FOR VEHICLES.
APPLICATION FILED APR. 27, 1907.

2 SHEETS—SHEET 1.

Witnesses:
Johanne Daumberger
Joseph E. Cavanaugh

Inventor:
Martin Fischer
by
Max W. Ordmann
Attorney

No. 860,909. PATENTED JULY 23, 1907.
M. FISCHER.
BRAKE FOR VEHICLES.
APPLICATION FILED APR. 27, 1907.
2 SHEETS—SHEET 2.
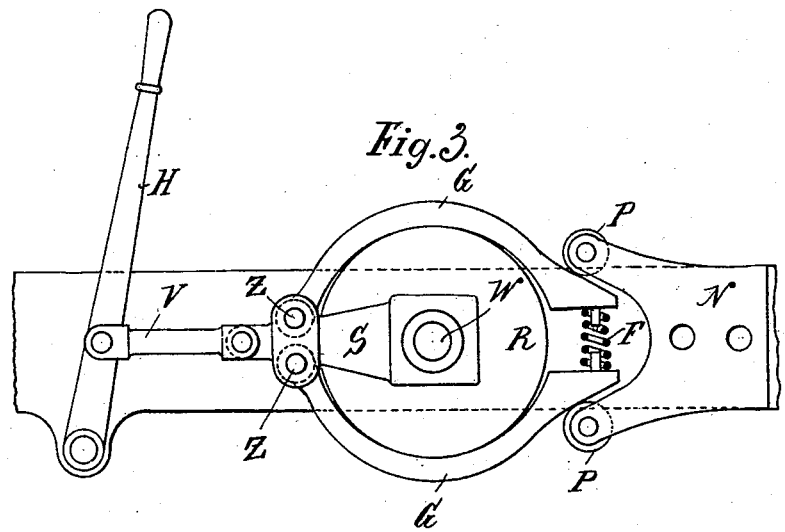
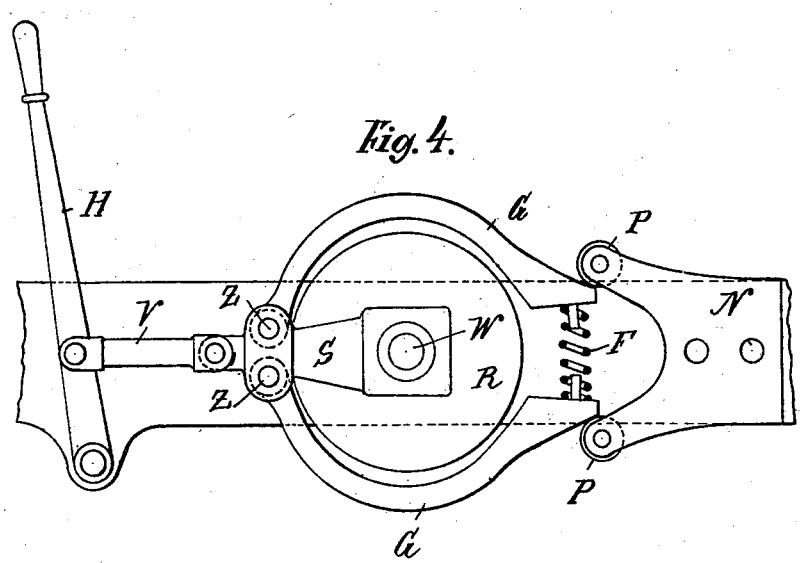

UNITED STATES PATENT OFFICE.

MARTIN FISCHER, OF ZURICH, SWITZERLAND.

BRAKE FOR VEHICLES.

No. 860,909.  Specification of Letters Patent.  Patented July 23, 1907.

Application filed April 27, 1907. Serial No. 370,600.

*To all whom it may concern:*

Be it known that I, MARTIN FISCHER, a resident of Zurich, Switzerland, have invented certain new and useful Improvements in Brakes for Vehicles, of which the following is a specification.

The present invention relates to brakes for vehicles of all kinds fitted with frictional driving gear, and particularly to mechanism in which the brake is applied and released by displacement of a sliding part connected with the movable brake parts.

The essential feature of the invention is that the motion of the sliding part actuates both the brake-drum mounted on the friction-wheel shaft and the brake-jaws. This produces an acceleration of the braking action and renders it independent of the operation of the friction-wheel gear.

The accompanying drawing illustrates two modes of carrying out the invention.

Figure 1:
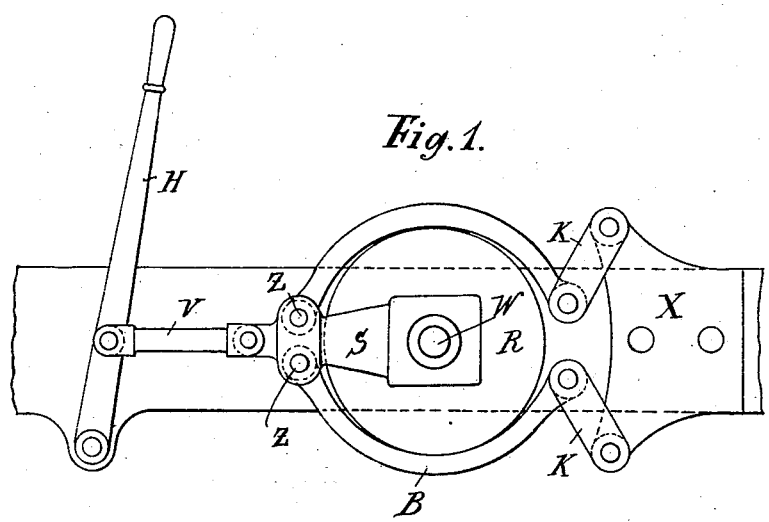
Figure 2:
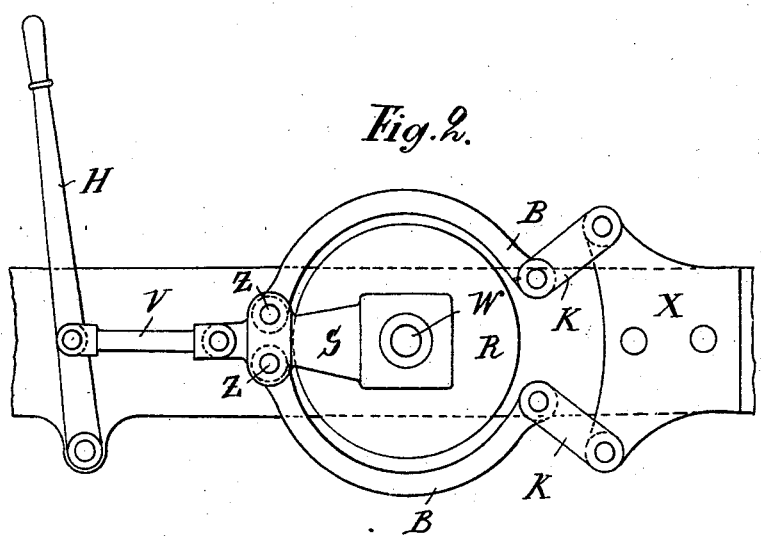

Figures 1 and 2 are elevations of the first construction, showing the brake respectively in and out of action. Figs. 3 and 4 are like views of the second construction.

Referring to Figs. 1 and 2 the bearing-bracket S of the friction-shaft W, constitutes a slide, moving in a horizontal direction on the frame of the vehicle. The axle W, carries the brake-disk, R. The slide S, is actuated by the lever, H, connected to it by the rod, V, and it is provided with two pins, Z, Z, by means of which the one end of each brake-jaw, B, is pivoted to it. The other end of each jaw is jointed to a link, K, pivoted to the bracket, X, secured to the vehicle-frame. On the friction-wheel axle bearing, or slide, S, being moved towards the bracket, X, the brake-bands or jaws, B, are pressed by means of the links, K, against the brake-drum, R, thereby applying the brake. The reverse movement of the lever, H, on the other hand, removes the slide, S, from the bracket, X, and the brake-bands or jaws are released from the brake-drum.

In the modification shown in Figs. 3 and 4, the brake-bands or jaws, G, have wedge-shaped ends, which on the lever, H, being pulled are pushed between two rollers, P, carried by the bracket, N, secured to the frame of the vehicle, whereby the brake-bands or jaws are faced firmly against the brake-drum, R. On the lever, H, being thrown over in the opposite direction, the jaws, G, are disengaged from the rollers, P. A spring, F, is arranged between the bands or jaws, G, in order to insure certain release of the jaws, G, from the drum, R, when the brake is taken off.

Having thus described my invention, what I claim as new and desire to secure by Letters Patent is:

1. A vehicle-brake, comprising in combination, a friction-wheel shaft, a brake-disk mounted thereon, a sliding bearing for the shaft, brake-jaws pivoted at one end to the bearing, and means secured to the vehicle-frame for closing the opposite ends of the jaws on the bearing being slid toward said means, substantially as described.

2. A vehicle-brake, comprising in combination, a friction-wheel shaft, a brake-disk mounted thereon, a sliding bearing for the shaft, and brake-jaws pivoted at one end to the bearing and linked at the other end to the vehicle frame, substantially as described.

Signed at American consulate at Zurich this 9 day of April 1907.

MARTIN FISCHER.

Witnesses:
PAUL VORBRODT,
JOSEPH SIMON.